US 6,601,924 B1

(12) United States Patent
Hicks

(10) Patent No.: US 6,601,924 B1
(45) Date of Patent: Aug. 5, 2003

(54) DUAL USE TRAILER

(76) Inventor: W. Glen Hicks, P.O. Box 914, Minden, LA (US) 71055

( * ) Notice: Subject to any disclaimer, the term of this patent is extended or adjusted under 35 U.S.C. 154(b) by 0 days.

(21) Appl. No.: 10/068,456

(22) Filed: Feb. 5, 2002

(51) Int. Cl.[7] ............... B60P 3/22; B60P 3/24
(52) U.S. Cl. ............. 298/8 R; 298/8 T; 298/17.7; 298/18
(58) Field of Search ............ 298/8 R, 8 T, 17.7, 298/18

(56) References Cited

U.S. PATENT DOCUMENTS

| | | | | | |
|---|---|---|---|---|---|
| 744,980 | A | * | 11/1903 | Ray | 296/1.1 |
| 1,013,789 | A | * | 1/1912 | Longest | 298/18 |
| 2,002,757 | A | * | 5/1935 | Shand | 222/52 |
| 2,222,083 | A | * | 11/1940 | Lintz | 280/830 |
| 2,770,490 | A | * | 11/1956 | Hockensmith, Jr. | 298/8 R |
| 2,898,872 | A | * | 8/1959 | Hasting, Jr. | 410/80 |
| 2,929,658 | A | * | 3/1960 | Killebrew | 298/8 R |
| 4,494,798 | A | * | 1/1985 | Bailey | 298/17.6 |
| 5,456,520 | A | | 10/1995 | Adams et al. | 298/22 R |
| 6,402,453 | B1 | * | 6/2002 | Jensen et al. | 414/501 |

OTHER PUBLICATIONS

Clement Sidestar Brochure.

* cited by examiner

Primary Examiner—D. Glenn Dayoan
Assistant Examiner—Paul Chenevert
(74) Attorney, Agent, or Firm—Thompson & Gustavson, L.L.P.

(57) ABSTRACT

A vehicle (10) which includes a trailer (14) having a frame (16). A first tank (22) is mounted at the forward end of the trailer (14) and a second tank (26) is mounted at the rear of the trailer (14). A dump body (30) is mounted on the trailer (14) between the first and second tanks. The dump body provides the ability to transport solid material and dump the material to either side of the trailer. The first and second tanks provide the ability to transport liquid material. A conduit (32) can be provided between the first and second tanks to shift fluid between the tanks.

5 Claims, 3 Drawing Sheets

DUAL USE TRAILER

TECHNICAL FIELD

This invention relates to the transportation of materials, particularly by use of a tractor-trailer combination.

BACKGROUND OF THE INVENTION

Traditionally, a trailer used in a tractor-trailer combination is designed for one specific purpose, whether it be for carrying a solid, such as gravel or dirt, or a fluid, such as oil. However, once the load hauled by the trailer is delivered to the ultimate destination, the trailer must be returned empty to pick up the next load. The return trip is therefore nonproductive.

U.S. Pat. No. 5,456,520 issued on Oct. 10, 1995 to Adams et al describes a vehicle for transporting alternative substances in alternative containers. The patent discloses an attempt to use a single trailer to carry either a liquid load or a solid load, permitting the trailer to be more productively used in a specific situation where a liquid is to be transported to a site and a solid is to be loaded at the site for return to the original location. This is accomplished in the patent by moving the particular container to be used to the center of the vehicle to provide a balanced load. However, this requires complicated machinery and adjustment of the position of the containers each time the trailer is loaded. A need exists for an improved design to facilitate increased efficiency in use of a trailer.

SUMMARY OF THE INVENTION

In accordance with one aspect of the present invention, a trailer is provided for selectively hauling a fluid and a solid. The trailer includes a frame, a first tank for holding the fluid mounted proximate a first end of the frame and a second tank for holding the fluid mounted proximate the second end of the frame. A side dump is mounted on the frame between the first and second tanks for dumping a load therein over at least a first side of the trailer.

In accordance with another aspect of the present invention, a conduit connects the first tank and the second tank. A valve can be positioned in the conduit. With the valve open, the liquid load in the first tank and the second tank can be balanced. With the valve closed, the liquid load in the first tank and the second tank can be different to provide flexibility in load balancing.

In accordance with another aspect of the present invention, a trailer is provided for selectively hauling a fluid and a solid. The trailer includes a frame, a first side dump for holding the solid mounted proximate a first end of the frame and a second side dump for holding the solid mounted proximate the second end of the frame. A tank for holding the fluid is mounted on the frame between the first and second side dumps. The first and second side dumps permit dumping of the contents therein over at least a first side of the trailer.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

Figure 1:
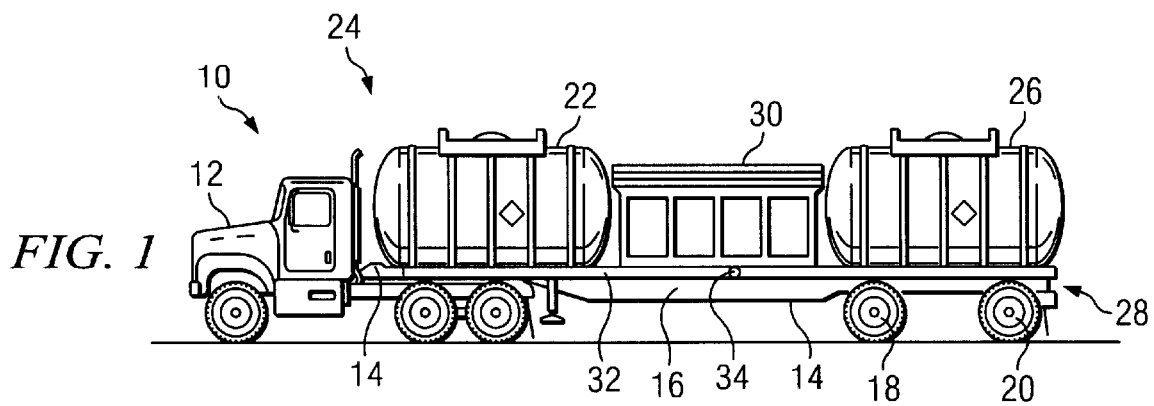
FIG. 1 is a side view of a first embodiment of the present invention utilizing first and second tanks and a side dump.

With reference now to the figures, wherein like reference numerals are used for like or corresponding parts throughout the several views, there is illustrated a transportation vehicle 10 which forms a first embodiment of the present invention. The vehicle 10 includes a conventional tractor 12 and a trailer 14 in which improvements have been incorporated as will be described hereinafter.

With reference to FIGS. 1 and 2–7, trailer 14 can be seen to include a frame 16, a pair of axles 18 and 20, a first tank 22 at a forward end 24 of the frame 16, a second tank 26 at the rear end 28 of the frame 16 and a dump body 30 near the center of the frame between the first tank 22 and second tank 26. Preferably, the first tank 22 and second tank 26 are connected by a conduit 32 along which is mounted a valve 34. The first and second tanks are used to carry fluids and the valve 34 in the conduit 32 can be opened, permitting fluid to flow between the first tank 22 and second tank 26 to equalize the weight in the tanks. Alternatively, the valve 34 can be closed to isolate the first tank 22 from the second tank 26 to allow different quantities of liquid to be placed in each tank to vary the weight distribution of the trailer 14. Separate devices can be used to fill and empty the tanks 22 and 26 or these devices can be incorporated with conduit 32 and valve 34.

Figure 3:
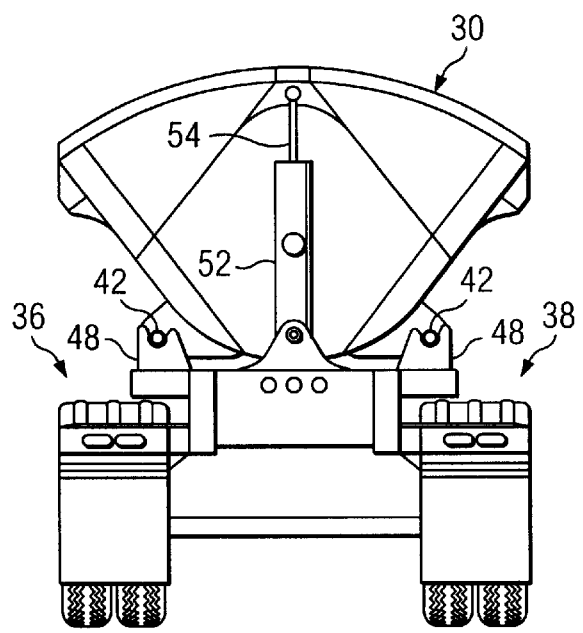
FIG. 3 is an illustrative view of the side dump positioned on the trailer for movement on the highway.
Figure 4:
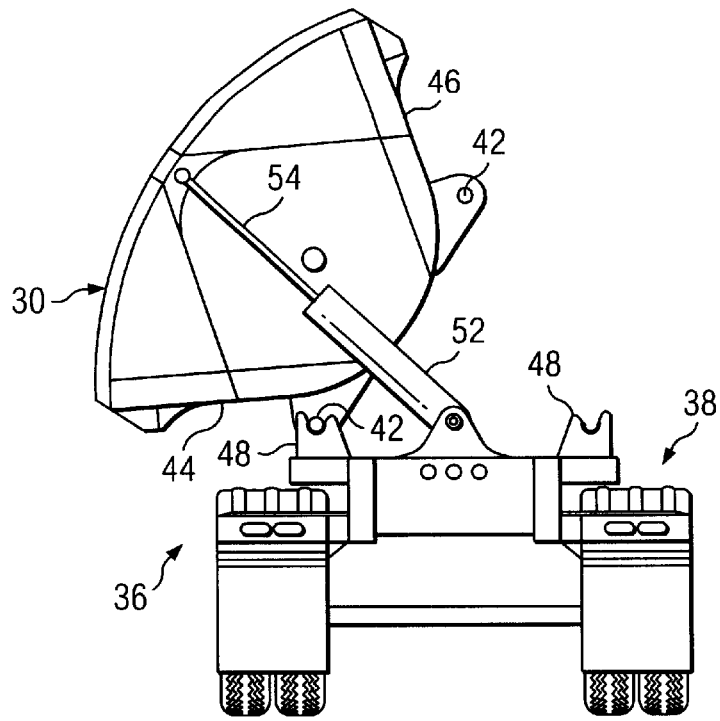
FIG. 4 is as illustrative view of the side dump positioned for dumping on the left side of the trailer.
Figure 5:
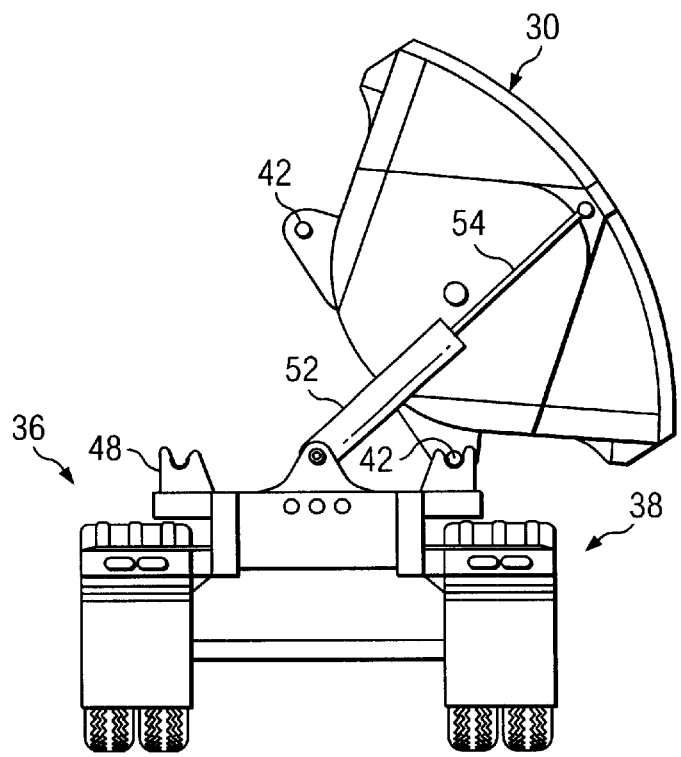
FIG. 5 is an illustrative view of the side dump positioned for dumping on the right side of the trailer.
Figure 6:
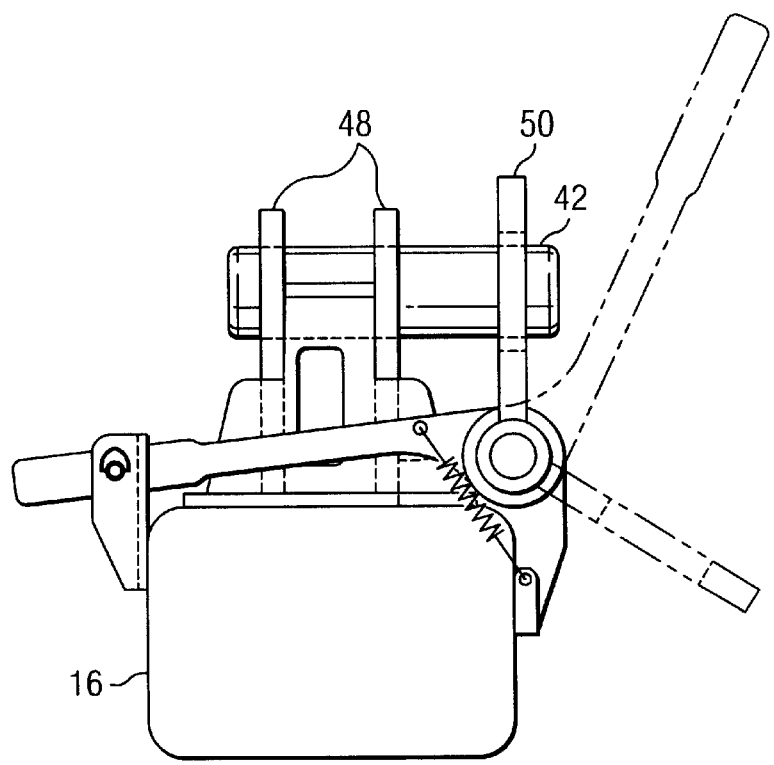
FIG. 6 is a detail view of the latch assembly of the side dump.
Figure 7:
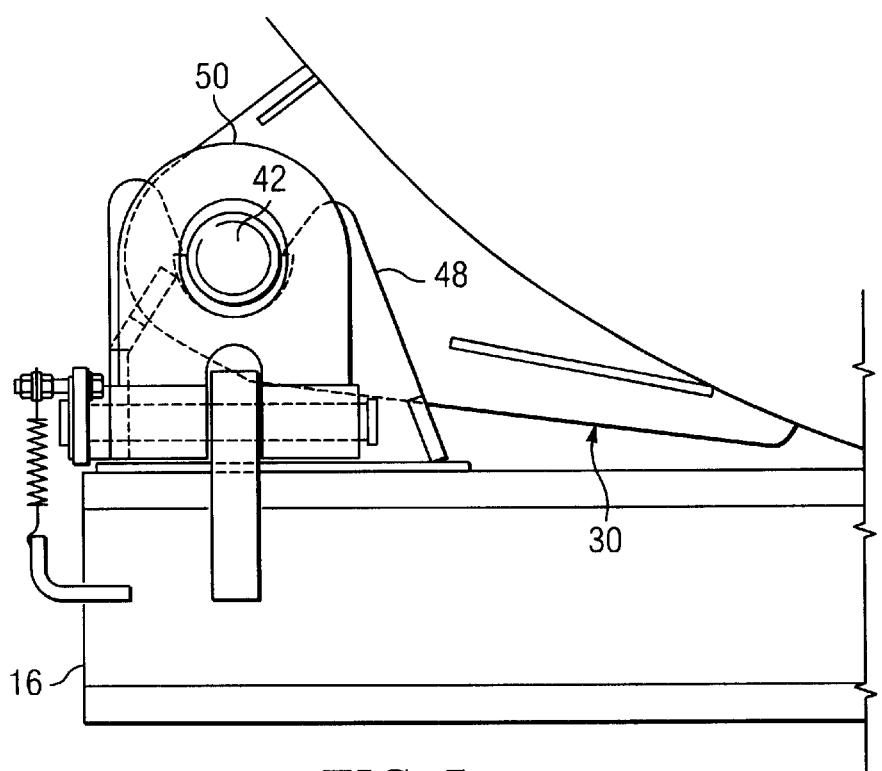
FIG. 7 is another detail view of the latch assembly of the side dump.

With reference to FIGS. 4–7 the dump body 30 can be seen to be pivotal to dump a load contained therein either to the left side 36 of the trailer 14, as seen in FIG. 4, or to the right side 38 of the trailer 14, as seen in FIG. 5. The dump body 30 can be seen to have pins 42 at each corner of the dump body 30 which extend along the length of the dump body 30. The pins 42 on a first side 44 of the dump body are aligned axially while the pins 42 on the second side 46 of the dump body 30 are also aligned axially. The pins 42 on the dump body are received in U-shaped saddles or notches 48 formed on the frame 16 when in the traveling position. A body latch 50 (FIGS. 6 and 7) is associated with each notch 48 which, in a locking position, locks the pin 42 in the notch 48, and in the released position, allows the pin 42 to move out of the associated notch 48. A hydraulic cylinder 52 is mounted to the frame 16 near the centerline of the frame and includes a piston 54 which is secured to the dump body 30, as seen in FIGS. 3–5.

When the trailer 14 is prepared for travel on the highway, the body latches 50 are actuated to the latching positioned to prevent the pins 42 from moving out of the associated notches 48, as seen in FIG. 3, to prevent the dump body 30 from moving relative to the frame 16. When the dump body 30 is to be dumped to the left side 36 of the trailer 14, the body latches 50 on the right side 38 of the trailer 14 are actuated to the released positioned and the piston 54 is extended from the cylinder 52. This pivots the dump body 30 about the pins 42 on the left side 36 of the trailer 14, as seen in FIG. 4, to dump the load within the dump body 30 on the left side 36 of the trailer 14. Alternatively, the dump body 30 can be dumped to the right side 38 of the trailer 14 by moving the body latches 50 on the left side 36 of the trailer 14 to the released position and extending the piston 54 from the cylinder 52 to pivot the dump body 30 about the pins 42 on the right side 38 of the trailer 14, as seen in FIG. 5, to dump the load in the dump body 30 on the right side of the trailer 14. Dump body 30 can be designed to dump to only one side, if desired.

As is apparent, the trailer 14 can be used to haul both liquid materials in the first and second tanks 22 and 26 and solid material in the dump body 30. For example, it may be necessary in a mining operation to transport a solid material in the dump body 30 to a mine location and return with a liquid in the tanks 22 and 26. This allows the same trailer 12 to be used more efficiently.

While the weight of the empty tanks 22 and 26 are not productive while carrying solid material in the dump body 30, this deficit is overcome by the ability to carry liquids in the tanks 22 and 26 on a return trip which would otherwise not be productive if the trailer was only able to carry solid material.

Figure 2:
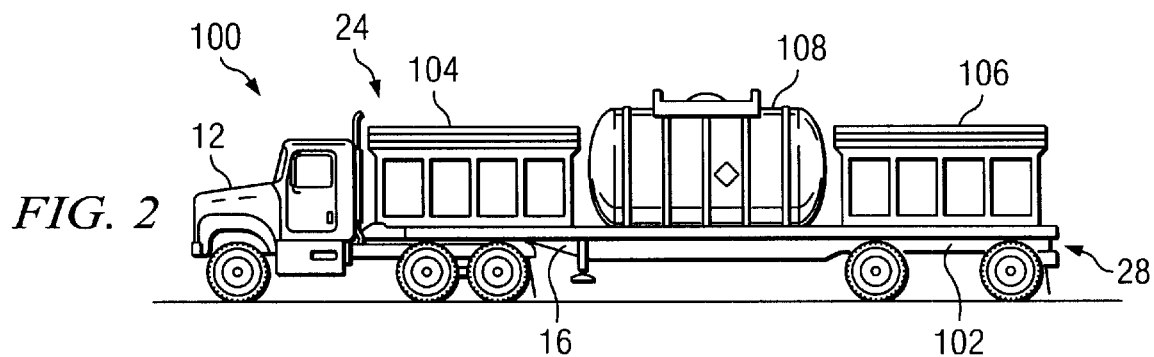
FIG. 2 is a side view of a second embodiment of the present invention utilizing first and second side dumps and a tank.

With reference to FIG. 2, a second embodiment of the present invention is disclosed as transportation vehicle 100. The transportation vehicle 100 also includes a tractor 12 but has a modified trailer 102. Trailer 102 has a dump body 104 mounted at the forward end 24 of the frame 16 and a dump body 106 mounted at the rear end 28 of the frame 16. A single tank 108 is mounted to the frame 16 between the dump bodies 104 and 106. The dump bodies 104 and 106 operate to allow dumping on either side of the trailer in the same manner as dump body 30. The vehicle 100 achieves the same result as vehicle 10, but provides for a different weight distribution of materials.

While the embodiments of the present invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

What is claimed is:

1. A trailer for selectively hauling a fluid or a solid material, comprising:
   a frame;
   a first tank for holding the fluid mounted at a first end of the frame;
   a second tank for holding the fluid mounted at a second end of the frame;
   a side dump for holding the solid material mounted on the frame between the first and second tanks, the side dump for dumping the solid material to at least one side of the trailer.

2. The trailer of claim 1 further comprising a conduit connecting the first tank and the second tank permitting fluid to flow between the first tank and second tank.

3. The trailer of claim 2 further comprising a valve in the conduit to prevent fluid flow between the first tank and second tank.

4. The trailer of claim 1 wherein the side dump permits dumping the solid material on either side of the trailer.

5. A trailer for selectively hauling a fluid or a solid material, comprising:
   a frame;
   a first side dump for holding the solid material mounted on a first end of the frame, the first side dump for dumping the solid material on at least one side of the trailer;
   a second side dump for holding the solid material mounted on a second end of the frame, the second side dump for dumping the solid material on at least one side of the trailer;
   a tank for holding the fluid mounted on the frame between said first and second side dumps.

* * * * *